United States Patent
Robledo et al.

(10) Patent No.: US 10,802,697 B1
(45) Date of Patent: Oct. 13, 2020

(54) MECHANISM FOR RANGE SLIDER THUMB SELECTION

(71) Applicant: Google LLC, Mountain View, CA (US)

(72) Inventors: Anthony Nicholas Robledo, Brooklyn, NY (US); David Haw Yun Chiu, Oakland, CA (US); Cortney Cassidy, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/784,927

(22) Filed: Feb. 7, 2020

(51) Int. Cl.
*G06F 3/0484* (2013.01)
*G06F 3/0488* (2013.01)

(52) U.S. Cl.
CPC ...... *G06F 3/04847* (2013.01); *G06F 3/04842* (2013.01); *G06F 3/04845* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 7,117,450 B1 * | 10/2006 | Chaudhri | G06F 3/04847 715/787 |
| 10,001,909 B2 | 6/2018 | Edwards et al. | |
| 2014/0075387 A1 * | 3/2014 | Fujibayashi | G06F 3/0488 715/833 |
| 2014/0282252 A1 * | 9/2014 | Edwards | G06F 3/04847 715/833 |
| 2015/0193109 A1 * | 7/2015 | Takahashi | G06F 3/0488 715/833 |
| 2018/0267698 A1 * | 9/2018 | Kimura | G06F 3/038 |
| 2019/0116293 A1 * | 4/2019 | Bury | G06T 5/20 |
| 2019/0354265 A1 * | 11/2019 | Winnemoeller | G06T 11/001 |

OTHER PUBLICATIONS

Robledo, Anthony, "Material RangeSlider in Flutter", Flutter—Medium, Jul. 11, 2019, medium.com/flutter/material-range-slider-in-flutter-a285c6e3447d, pp. 1-13.
Vitaly Friedman, "Designing the Perfect Slider", Smashing Magazine, Jul. 19, 2017, www.smashingmagazine.com/2017/07/designing-perfect-slider/.

* cited by examiner

*Primary Examiner* — Toan H Vu
(74) *Attorney, Agent, or Firm* — Leason Ellis LLP

(57) ABSTRACT

A graphical user interface and a range slider are provided. Each of a first and second slider thumb is positioned at a respective location along a slider track, and associated with a corresponding value along the slider track. User interaction is detected and identified to include at least one of a tap or a drag. A hardware processor responds to the user interaction by processing a value representing the tap or the drag to determine a location along the slider track of the user interaction. The processor identifies the interaction as being with one of the first and second slider thumbs, and repositions the identified one slider thumb to the determined location along the slider track. In addition, a graphical selection overlay is on the selected slider thumb, and by determining a slider track value associated with the repositioned location of the selected one slider thumb along the slider track.

20 Claims, 13 Drawing Sheets

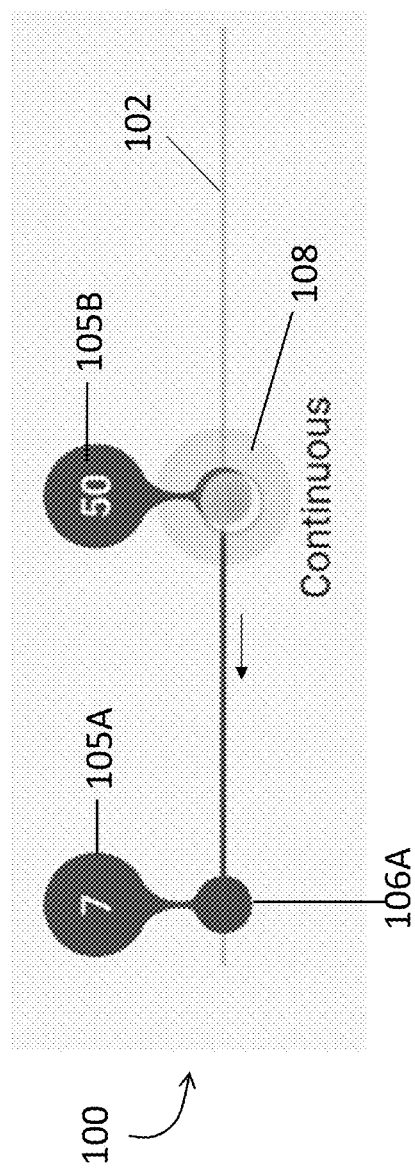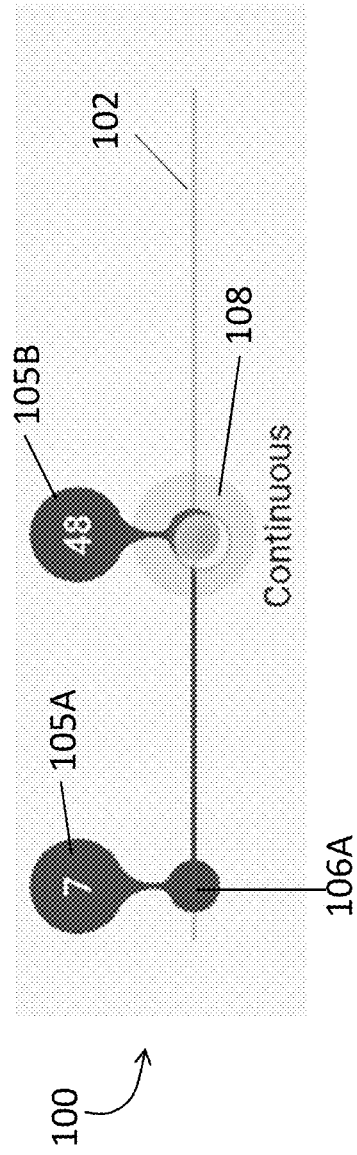

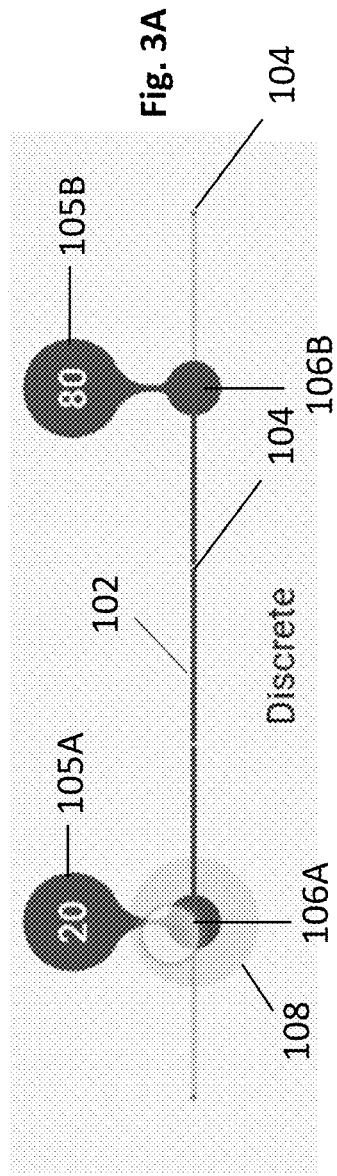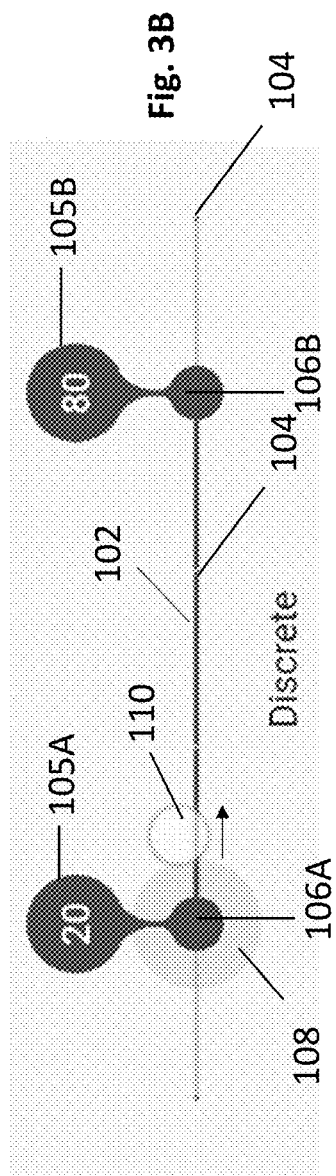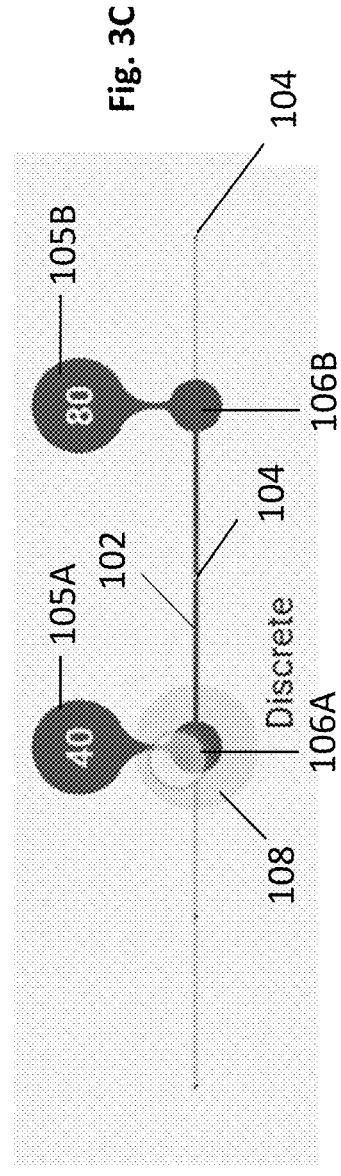

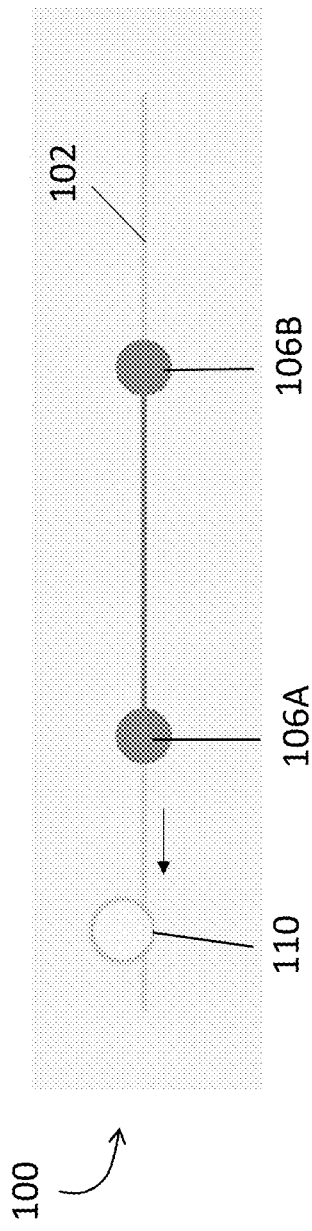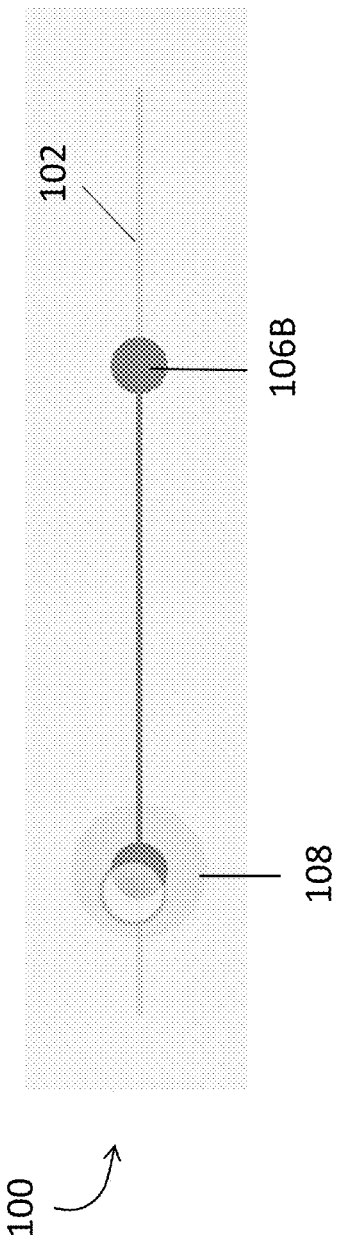

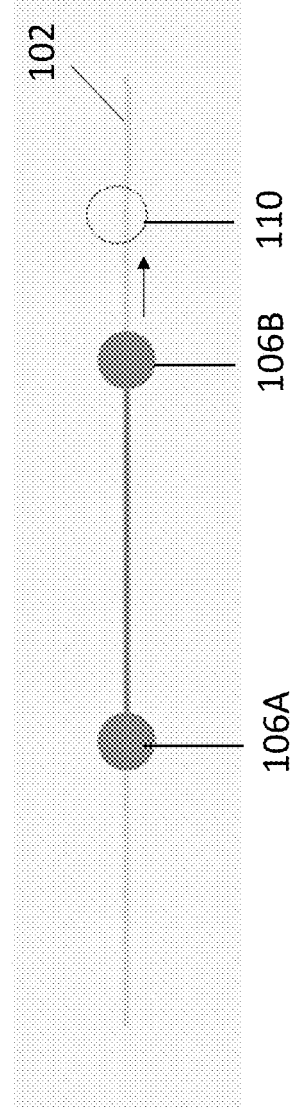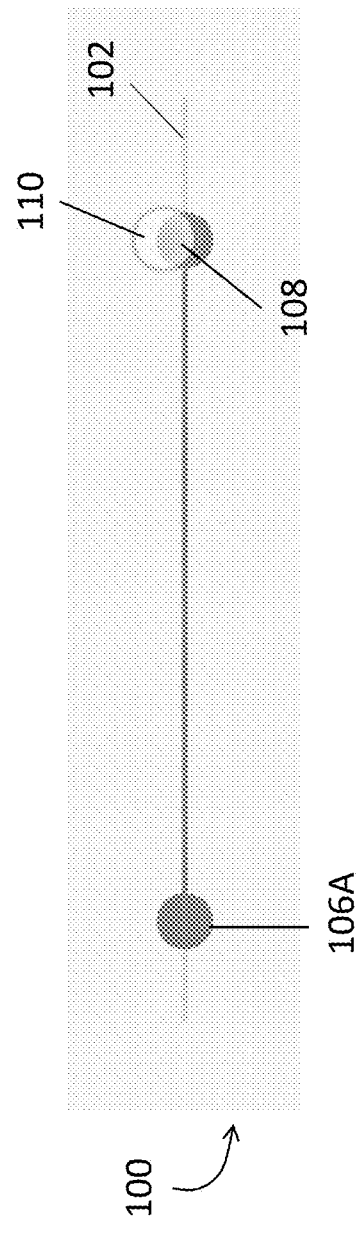

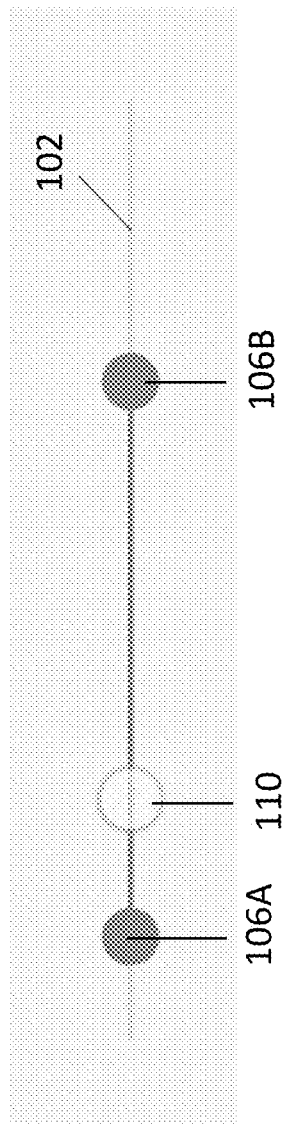
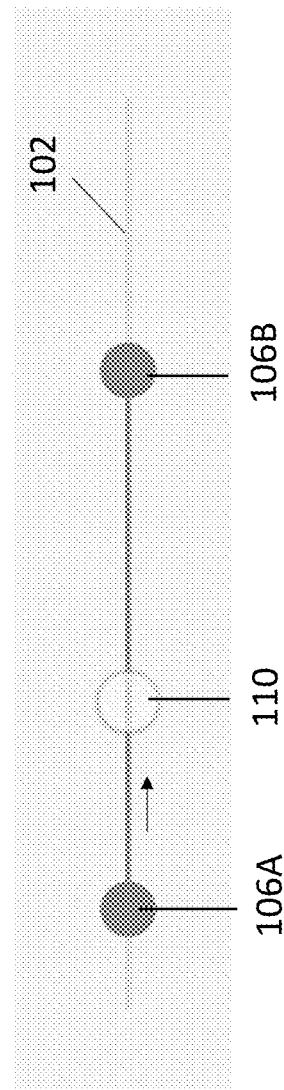
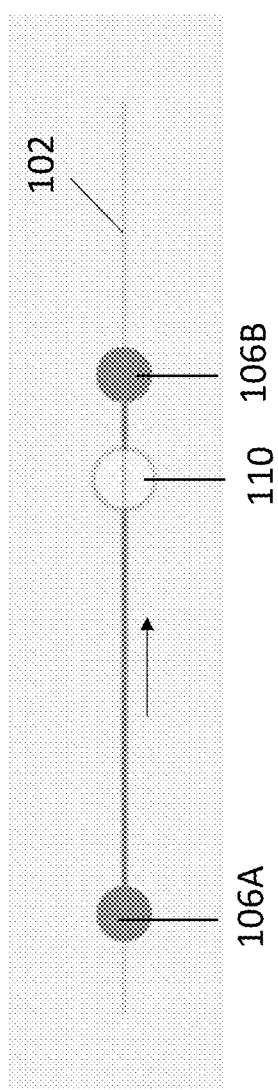

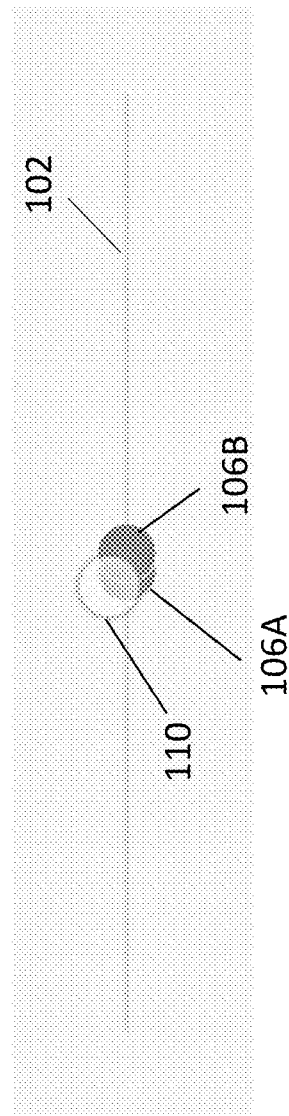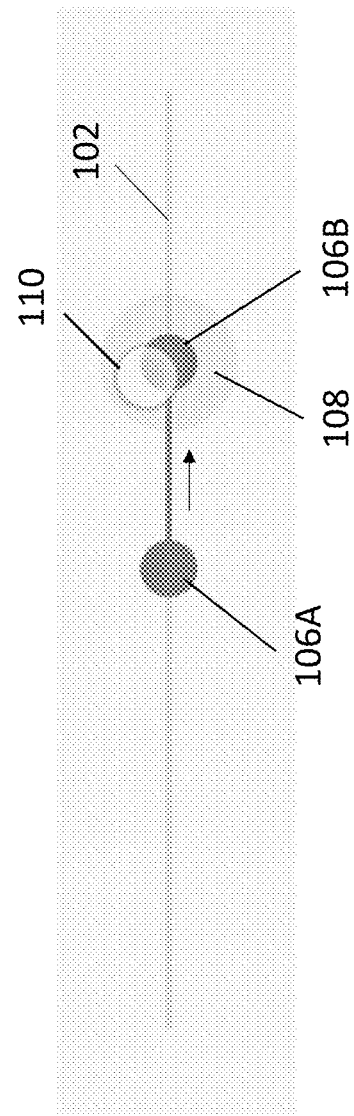

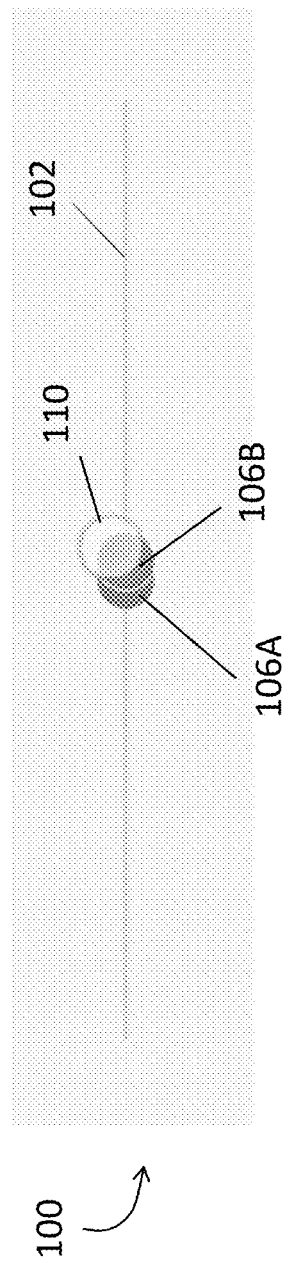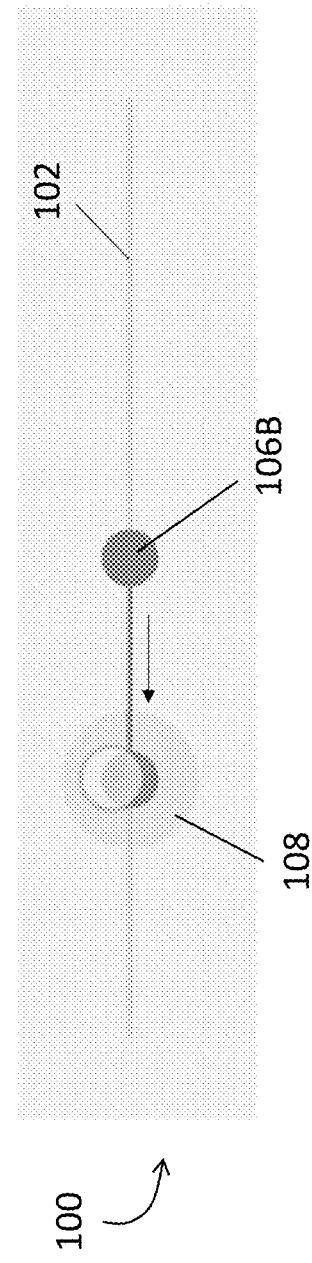

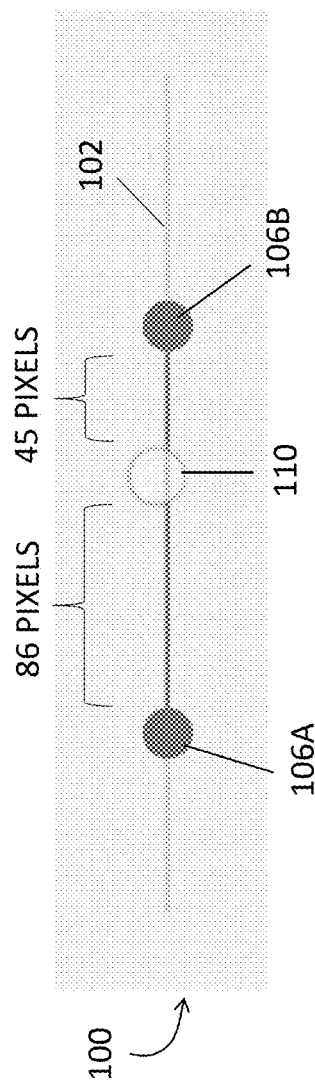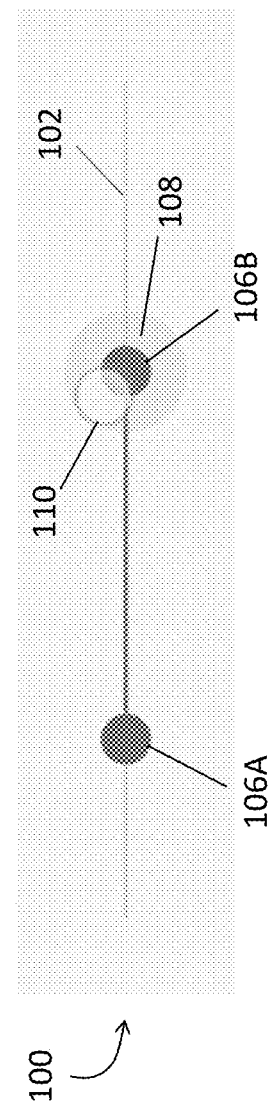

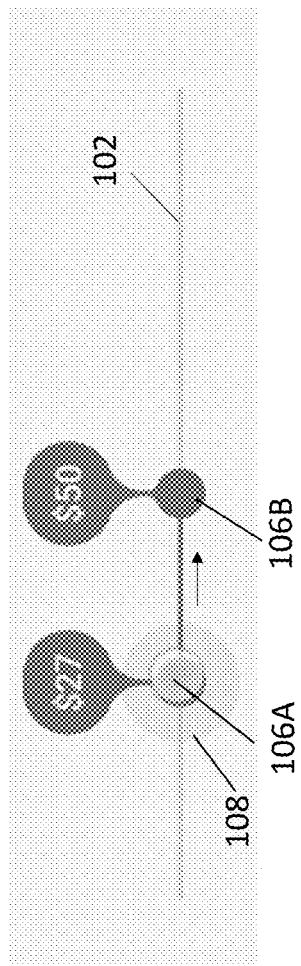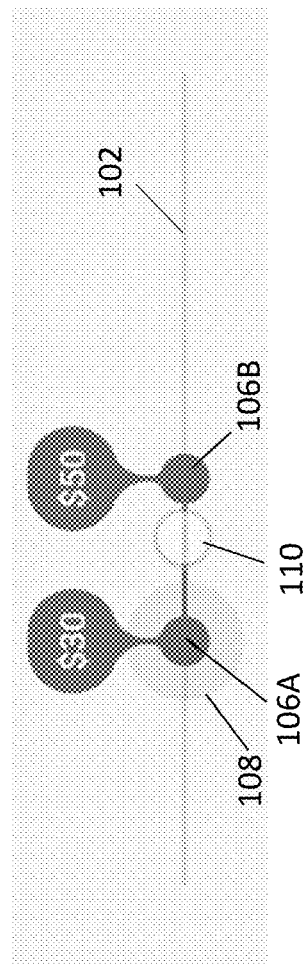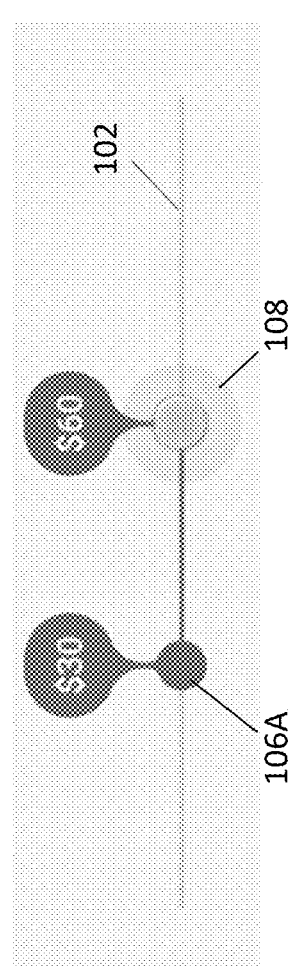

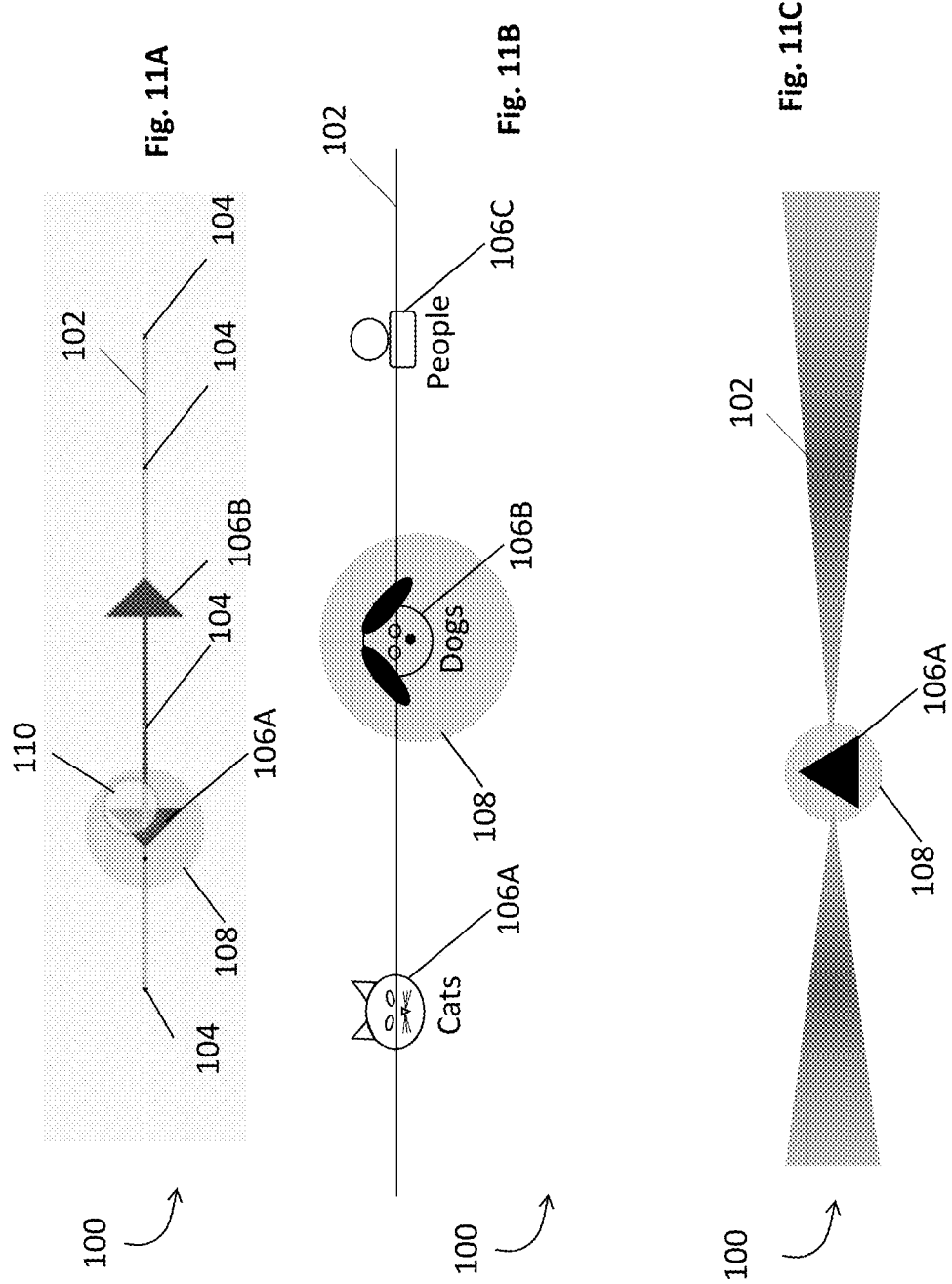

MECHANISM FOR RANGE SLIDER THUMB SELECTION

FIELD OF THE DISCLOSURE

The present disclosure relates to a computer interface solution that includes a method, a system, and a computer program for determining, selecting, and identifying range slider controls on a computing device.

BACKGROUND OF THE DISCLOSURE

Computing devices of all types use graphical user interfaces for users to interact with the computing devices. User interface elements such as check boxes, buttons, sliders, drop lists, or the like allow users to add or edit information, make selections, and instruct the computing device to operate in particular ways. Mobile computing devices, such as tablet computers, smartphones, and laptop computers, which are configured with touch screen technology use graphical user interfaces to operate in distinct ways that make the devices more intuitive. Graphical user interfaces are continually developed and updated to improve ease and time savings during use.

Many graphical user interfaces include selectable range sliders, which can include a track and slider "thumbs" that enable users to define two or more respective values. The values can represent the endpoints of a range, and the two slider thumbs can be adjusted for a user to set the lowest and highest values. Users can interact with range sliders with a mouse or other device, or by touching and dragging on a screen. Currently, selection of particular ones of range sliders can be imprecise. Users may have trouble moving specific controls, or may be unable to control the range sliders. It can be difficult, for example, to move range sliders to an exact position, or two or more range sliders may partially or completely overlap in the graphical interface, making selection of individual sliders difficult or impossible.

SUMMARY OF THE DISCLOSURE

A system, method, and non-transitory computer storage medium encoded with a computer program are disclosed that include a hardware processor, a display, and processor readable hardware storage. The storage can include processor executable instructions that are executable by the processor. In one or more implementations of the present disclosure, a graphical user interface and a range slider are provided via the display. The range slider includes a first slider thumb, a second slider thumb, and a slider track having the first and second slider thumbs slidable graphically therealong. Moreover, each of the first slider thumb and the second slider thumb is positioned at a respective location along the slider track. Further still, each of the first slider thumb and the second slider thumb is associated with a corresponding value along the slider track. User interaction is detected in the graphical user interface via the range slider, and the user interaction is identified to include at least one of a tap or a drag. The processor, so configured by executing the instructions, responds to the user interaction by receiving a value representing the tap or the drag, and by processing the value to determine a location along the slider track of the user interaction. Further, the processor responds by identifying, as a function of at least the determined location along the slider track of the user interaction, one of the first slider thumb and the second slider thumb. In addition, the processor responds by selecting the one slider thumb identified on the basis of the determined direction of movement, and by repositioning the selected one slider thumb to the determined location along the slider track. In addition, the processor responds by providing a graphical selection overlay on the selected slider thumb, and by determining a slider track value associated with the repositioned location of the selected one slider thumb along the slider track.

In one or more implementations, selecting the determined one of the first slider thumb and the second slider thumb includes selecting the first slider thumb, processing the determined location along the slider track of the user interaction, as well as the location along the slider track of the first slider thumb, and the location along the slider track of the second slider thumb. As a function of the processing, the processor determines that the location of the user interaction is closer to the position of the first slider thumb than the position of the second slider thumb, and further that the determined location along the slider track of the user interaction is not between the location along the slider track of the first slider thumb and the location along the slider track of the second slider thumb.

Alternatively, selecting the determined one of the first slider thumb and the second slider thumb includes selecting the second slider thumb by processing the determined location along the slider track of the user interaction, as well as the location along the slider track of the first slider thumb, and the location along the slider track of the second slider thumb. As a function of the processing, the processor determines that the location of the user interaction is closer to the position of the second slider thumb than the position of the first slider thumb, and further that the determined location along the slider track of the user interaction is not between the location along the slider track of the first slider thumb and the location along the slider track of the second slider thumb.

In one or more implementations, the processor so configured by executing the instructions identifies that the user interaction includes a lift and responds to the user interaction by receiving a value representing lift and by removing the graphical selection overlay on the selected slider thumb.

In one or more implementations, the processor so configured by executing the instructions transmits to a software application executing by at least one hardware processor, the slider track value associated with the repositioned location of the selected one slider thumb, wherein the transmitted slider track value associated with the repositioned location of the selected one slider thumb is usable for further processing by the software application.

In one or more implementations in which the user interaction is determined to be a drag, the processor so configured by executing the instructions respond to the user interaction by receiving information representing drag displacement, wherein the drag displacement represents that the user interaction has at least a non-zero movement. In addition, the processor responds by processing the information representing the drag displacement to determine a direction of movement along the slider track of the user interaction. The processor further responds by identifying, as a function of at least the determined direction of movement, one of the first slider thumb and the second slider thumb, and by selecting the determined one slider thumb and repositioning the selected one slider thumb to the determined location along the slider track. In addition, a graphical selection overlay is provided on the selected slider thumb and a slider track value associated with the repositioned location of the selected one slider thumb along the slider track is determined.

Additional features, advantages, and embodiments of the disclosure may be set forth or apparent from consideration of the specification, including the detailed description, claims and drawings. The summary of the disclosure and the following detailed description and drawings may provide examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain principles of the disclosure. No attempt is made to show structural details of the disclosure in more detail than may be necessary for a fundamental understanding of the disclosure and the various ways in which it can be practiced.

FIGS. 2A-2B depict a non limiting example of a ranger slider operation sequence in accordance with an implementation of the present disclosure in which a slider track is configured with a range of continuous whole numbers.

FIGS. 3A-3C depict a non limiting example of a ranger slider operation sequence in accordance with an implementation of the present disclosure in which a slider track is configured with a range of discrete values.

FIGS. 4A-4B depict a non-limiting example of a ranger slider operation sequence in accordance with an implementation of the present disclosure in which user interaction along the slider track to the left of left-side slider thumb results in selection and movement of the left-side slider thumb.

FIGS. 5A-5B depict a non-limiting example of a ranger slider operation sequence in accordance with an implementation of the present disclosure in which user interaction along the slider track to the right of right-side slider thumb results in selection and movement of the right-side slider thumb.

FIGS. 6A-6C depict a non-limiting example of a ranger slider operation sequence in accordance with an implementation of the present disclosure in which user interaction along the slider track between the left-side slider thumb and the right-side slider thumb results in no selection or movement of either the left-side slider thumb or the right-side slider thumb.

FIGS. 7A-7D depict non-limiting examples of ranger slider operation sequences in accordance with implementations of the present disclosure in which drag displacement (i.e., a non-zero movement) during user interaction along the slider track is used to determine and select either the left-side or right-side slider thumbs.

FIGS. 9A-9B depict a non-limiting example of a ranger slider operation sequence in accordance with an implementation of the present disclosure in which a determination and selection of the right-side slider thumb is made as a function of a relative distance from a user interaction along the slider track to the right-side slider thumb.

FIGS. 10A-10C depict a non-limiting example of a ranger slider operation sequence in accordance with an implementation of the present disclosure in which selection and movement of at least one slider thumb is restricted or enabled based on a minimum range defined by values respectively associated with the two slider thumbs 106.

FIGS. 11A-11C depict examples of customized ranger sliders in accordance with an implementation of the present disclosure in which elements of the range sliders are configured with customized shapes and features.

Figure 1:
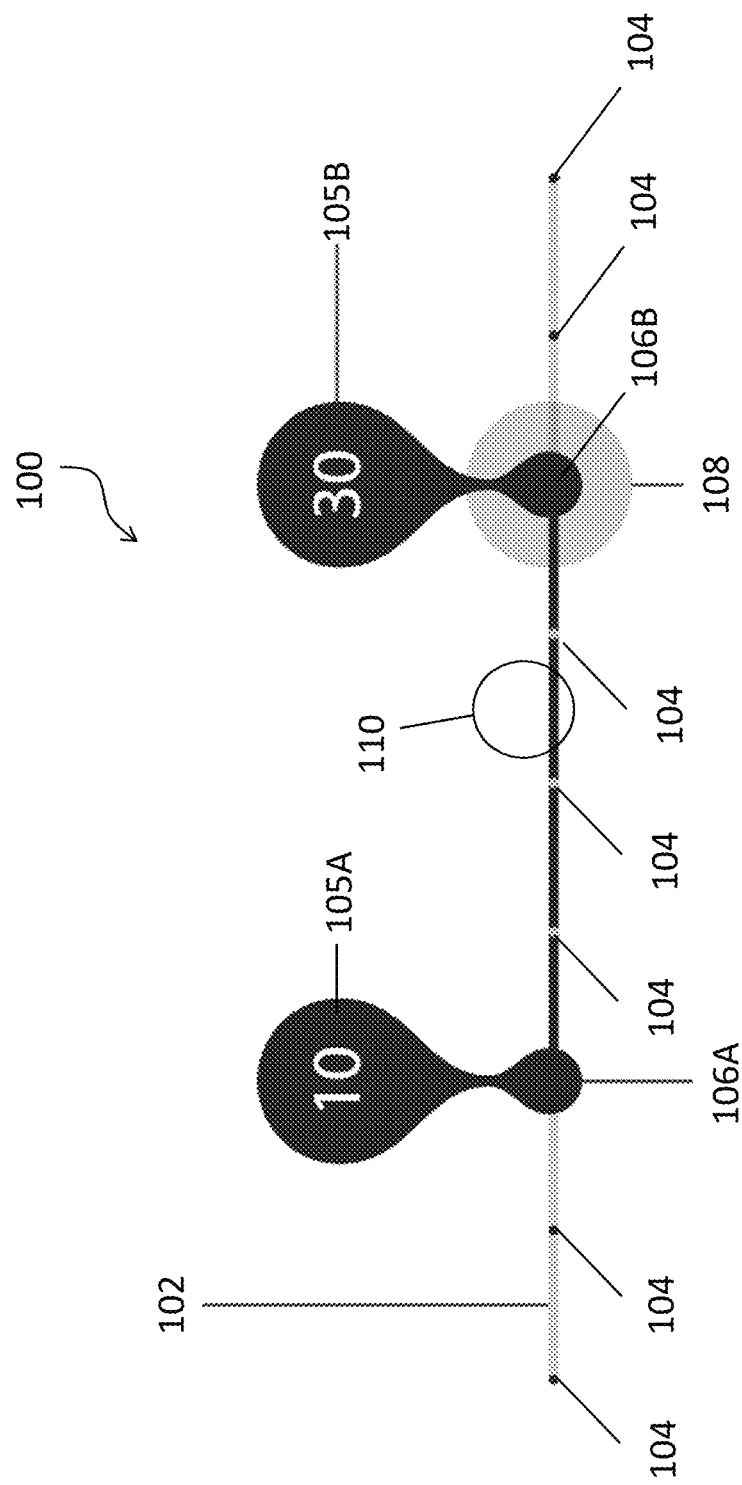
FIG. 1 illustrates a non-limiting example range slider and respective elements thereof, in accordance with one or more implementations of the present disclosure.

The present disclosure is further described in the detailed description that follows.

DETAILED DESCRIPTION OF THE DISCLOSURE

The disclosure and the various features and advantageous details are explained more fully with reference to the non-limiting embodiments and examples that are described or illustrated in the accompanying drawings and detailed in the following description. It should be noted that the features illustrated in the drawings are not necessarily drawn to scale, and features of one embodiment can be employed with other embodiments, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those of skill in the art to practice the embodiments of the disclosure. Accordingly, the examples and embodiments should not be construed as limiting the scope of the disclosure. Moreover, it is noted that like reference numerals represent similar parts throughout the several views of the drawings.

By way of overview, various implementations of the present disclosure provide technical improvements in the operation and functioning of computing devices. Such improvements can regard graphical user interfaces and, in particular implementations, range sliders. Range sliders can enhance a graphical user interface with controls for making multiple selections along a slider track. Unlike single selection sliders that include a first predetermined value, e.g., a minimum or maximum value, and a movable slider control enabling a selection of a second value in one direction, range sliders have two selection points (e.g., "thumbs"). Two selection points can allow for flexible and extremely precise adjustments of minimum and maximum values, such as to define a range. This flexibility makes range sliders particularly useful for instances in which a user prefers precise control over both ends of a specific range, and to define a range associated in various contexts, such as price, time, temperature, volume, or virtually any matter that supports ranges having lower and upper values.

Referring to the drawings, in which like reference numerals refer to like elements, FIG. 1 illustrates an example range slider and its respective elements, in accordance with one or more implementations of the present disclosure. In the implementation shown in FIG. 1, a range slider 100 is illustrated that includes a slider track 102 across which the thumbs 106A and 106B actuate. Although the label "range slider 100" is shown and used herein, each respective range slider 100 can be configured in a particular way and have unique operational capabilities. Therefore, it is to be recognized that use of the term range slider 100 is to be non-limiting and particular examples thereof to be understood in context.

In one or more implementations, slider track 102 can be configured to have discrete values, such as values in increments of 5, 10, or other value. In the implementation illustrated in FIG. 1, the slider track is configured with marks, referred to herein generally as "tick marks" 104, which represent and provide indicators of the respective increments on the slider track.

Continuing with reference to FIG. 1, two slider thumbs 106A and 106B are shown with range slider 100, which correspond to a minimum value (slider thumb 106A) and a maximum value (slider thumb 106B). In one or more implementations, the minimum value and the maximum value defines a range of values. The range slider 100 shown in FIG. 1 also includes value indicators 105A and 105B that display the values associated with slider thumb 106A and 106B, respectively. Although in the implementation shown in FIG. 1, indicators 105A and 105B display values corresponding to slider thumbs above the slider range 102 within balloon or pin markers, the values can be displayed to users in other locations or in other ways, such as via audible or tactile output.

In accordance with one or more implementations of the present disclosure, range slider 100 can indicate to users when a respective one of the slider thumbs 106 has been selected and available to be moved along the slider track 102. In the example shown in FIG. 1, selection overlay 108 is provided for slider thumb 106B to represent the slider thumb as being selected, and available for movement and defining a value. In one or more implementations present disclosure and illustrated in FIG. 1, selection overlay 108 is formatted as a translucent circle, and suitably sized and positioned over slider thumb 106 to provide the user with visible feedback that the slider thumb 106 has been recognized by processor executing in the code to implement the interface as having been selected. In one or more implementations, selection overlay 108 is displayed on a respective slider thumb when a user tabs or drags on a slider thumb that is configured to be selected in accordance with programmatic rules.

Continuing with reference to FIG. 1, additional animations can be provided to provide feedback for a user who has tapped or dragged in and along (or near) a slider track 102. In one or more implementations of the present disclosure, a position overlay 110 can be provided that represents a tap/drag and that is formatted as a transparent circle and that moves about the graphical user interface substantially at the positions where the user taps/drags. The overlay 110 can persist only during the user interaction or for a period of time after the interaction has concluded, such as, for example and not by way of limitation, for 0.5 second, 1.0 second, and so on.

In the meantime, once a user interaction is determined to be a lift, in one or more implementations, an animation associated with the range slider 100 appears to alter the selection overlay 108 and value indicator 105 animations that were provided during the drag interaction. For example, a processor executes one or more instructions in response to detecting a lift and determines a respective value that can represent a position along the slider track 102 for updating a value associated with a selected slider thumb 106, remove a selection overlay 108, and update a value in one or more value indicators 105. This provides the user with important feedback representing that updating of slider thumbs has ended and representing the values associated therewith following the user's interaction.

The present disclosure can provide particularly rich animations in connection with controls, such as a range slider, in a graphical user interface. Such animations can be user interaction-driven and useful to represent respective positions of a slider thumb, as well as to provide overlays and value indicators. In one or more example implementations, a range slider component can be configured to be stateful, including to store various animation controllers as a state. Those familiar with object-oriented programming technology will appreciate that, in certain implementations, values that are associated with and returned by a range slider component can be stored in a parent object that are extended therein.

In one or more implementations, particular user interactions and gestures are recognized and processed by a hardware processor to ensure proper performance and operation of a range slider 100 in accordance with teachings herein. In a non-limiting example, user interaction with a graphical in which a range slider 100 can be recognized as either a tap, drag, or lift. Upon a determination that a user gesture is one of a tap, drag, or lift, further processing can be performed, such as to determine which slider thumb, if any, should be selected. This can be implemented, for example, using object properties, such as one or more tap values representing where a user's tap occurred, a drag displacement value associated with drag displacement, a thumb size value representing slider thumb size, a text direction value representing text direction, or other suitable values. The values are evaluated by one or more processors and processed thereby to perform operations on the range slider 100, such as shown and described herein.

One principal operation on the range slider 100 that is performed by a hardware processor configured by executing code includes determining, in response to detected user interaction, which slider thumb 106 (e.g., 106A or 106B), if any, is to be selected and available for further user interaction. In one or more implementations, a respective slider thumb 106 that is positioned along the slider track 102 closest to the location where the tap occurred is identified, for example, as a function of a tap value. In the event that one respective slider thumb 106 is selected (e.g., whether one slider thumb is selectable in accordance with rules shown and described herein), the position of the selected slider thumb 106 is updated to the tap value such that the position of the selected slider thumb 106 reflects the location of the user's tap, for example, as represented by the tap value.

It is recognized by the inventors that certain contexts of range slider interaction should be configured to preclude a user from selecting and moving slider thumbs 106. For example, it may be unclear based on a user's gesture which slider thumb (e.g., slider thumb 106A or slider thumb 106B) has been selected or should be selected by the user. Incorrect selection of a respective slider thumb 106, such as in graphical user interfaces that support time-sensitive or other applications requiring highly precise operations, can be highly detrimental and precluding such error is a critical objective of the present disclosure. In accordance with this and other objectives, rules are defined and implemented by the processor that provides the graphical user interface in accordance with respective implementations of the present disclosure.

FIGS. 2A-2B depict a non-limiting example of a ranger slider 100 operation sequence in accordance with an implementation of the present disclosure in which a slider track is configured with a continuous range of whole numbers. In the example shown in FIG. 2A, slider thumb 106A has been positioned to define a value of 7, as represented in value indicator 105A. In the example shown in FIG. 2B, slider thumb 106B has been moved (indicated by a directional arrow in FIG. 2A below the slider track 102) from a position defining a value of 50 to a new position defining a value of 48, as represented in value indicator 105B. In one or more implementations, values associated with a range slider 100 are defined as a function of the slider track 102, such as by a minimum value at one end and a maximum value at the other. All values associated with positions of the slider thumbs 106 along the slider track 102 are, accordingly, within the minimum and maximum values defined the slider track 102. In the example shown in FIGS. 2A and 2B, the slider track defines a minimum value of 0 and a maximum value of 100 (not shown). As the user moves the slider thumb 106B 2% of the slider track to the left, the corresponding value associated with the slider thumb 106B is decreased by 2.

In contrast with the example shown in FIGS. 2A and 2B, FIGS. 3A-3C depict a non-limiting example of a ranger slider 100 operation sequence in accordance with an implementation of the present disclosure in which a slider track 102 is configured with a range of discrete values. In FIGS. 3A-3C, slider thumb 106A is moved along the slider track from an initial position (20) to a different position, one tick mark 104, to the right thereby defining an updated value of 40.

At the start of user interaction, a determination is made of which of the slider thumbs 106 has been meant to be selected by a user for processing of the values represented by the respective slider thumbs 106 and updating the interface. In one or more implementations, a rule can be provided for any tap or slide interaction that is along the slider track 102 and outside the range defined by the first and second slider thumbs 106. Accordingly, such interaction results in a selection of the nearest slider thumb 106 to the tap or slide. FIGS. 4A-4B depict a non-limiting example of a ranger slider operation sequence in accordance with an implementation of the present disclosure in which user interaction along the slider track to the left of left-side slider thumb 106A results in selection and movement of the left-side slider thumb 106A. Similarly, FIGS. 5A-5B depict a non-limiting example of a ranger slider operation sequence in accordance with an implementation of the present disclosure in which user interaction along the slider track to the right of slider thumb 106B results in selection and movement of the left-side slider thumb 106B.

In one or more implementations, if a tap value associated with a user's interaction represents that a user's tap gesture occurred between two slider thumbs and not within a location represented by a predefined touch target (e.g., within a boundary defining an area within a slider thumb 106), no slider thumb 106 is selected for user interaction. In other words, neither slider thumb 106A or slider thumb 106B can be selected in response to user interaction that involves tapping or dragging along a portion of the slider track 102 that is located between the slider thumb 106A and the slider thumb 106B. In such instance, tapping or dragging in an area between two slider thumbs 106 does not affect selection and interaction provided the slider thumbs are at least a predefined distance between each other. FIGS. 6A-6C depict a non-limiting example of a ranger slider operation sequence in accordance with an implementation of the present disclosure in which user interaction along the slider track between the slider thumb 106A and the right slider thumb 106B, as represented by position overlay 110, results in no selection or movement of either the slider thumb 106A or the slider thumb 106B.

In one or more alternative implementations, one or more rules can result in a selection of slider thumb 106A or slider thumb 106B even in cases where a user interaction along a slider track 102 between two slider thumbs 106 that are at least a predefined distance between each other. For example, one or more rules can be invoked for selecting one slider thumb 106 that is positioned closest to the position of a tap or drag, regardless of what part of the slider track 102 is tapped (or dragged along).

In one or more implementations of the present disclosure, positions and movements of slider thumbs 106 can be partially or completely restricted to accommodate particular disclosures or contexts of use. For example, if slider thumbs 106 are positioned in near proximity to each other, for example a minimum distance or such that any user tap gesture in an effort to select either slider thumb 106 would intersect each of the boundaries defining the respective slider thumbs, then, in accordance with rules set forth in a respective implementation, no slider thumb 106 can be selected. Intersecting boundaries of two or more slider thumbs 106 can prevent a processor from detecting which slider thumb 106 a user intends to select.

In certain applications and/or contexts, it can be desirable to enable a user's ability to select and move a slider thumb 106, notwithstanding the position of the slider thumb 106 being in close proximity to another, as described above. In one or more implementations, selecting and moving a respective slider thumb 106 that is positioned near another slider thumb 106 within a minimum distance (e.g., 4 logical pixels) can be enabled in response to a drag interaction and subsequent determination by a processor of the direction of the drag. FIGS. 7A-7D depict non-limiting examples of range slider operation sequences in accordance with implementations of the present disclosure, in which drag displacement during user interaction along the slider track is used to determine and select a respective slider thumb 106 (106A or 106B). In the example shown in FIG. 7A, a user tap (indicated by position indicator 110) intersects both slider thumbs 106A and 106B. Accordingly, neither slider thumb 106A or 106B is selected. In 7B, however, a drag action in the right-side direction results in a selection and movement of the right-side slider thumb (106B). Similarly, in the example shown in FIG. 7C, a user tap (indicated by position indicator 110) intersects both slider thumbs 106A and 106B. Accordingly, neither slider thumb 106A or 106B is selected. Conversely in 7B, a drag action in the left-side direction results in a selection and movement of the left-side slider thumb (106A).

Figure 8B:
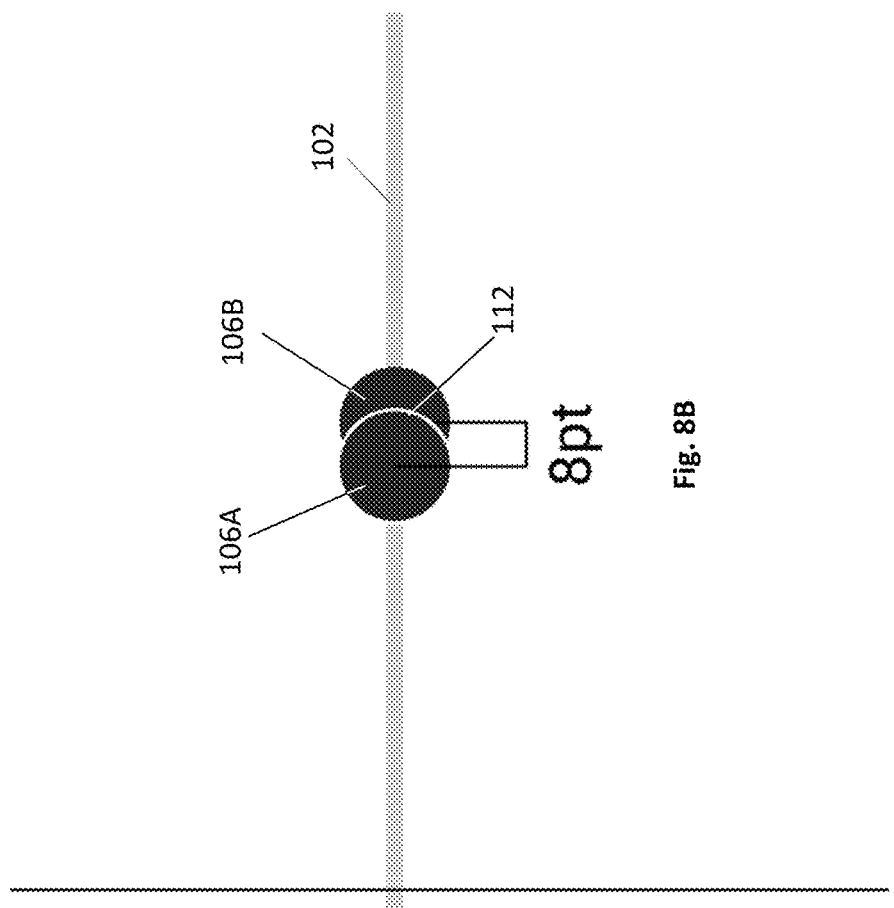
FIG. 8B depicts a non-limiting example of a ranger slider in accordance with an improved implementation of the present disclosure showing two overlapping slider thumbs, with one of the overlapping slider thumbs graphically demarcated from the other.
Figure 8A:
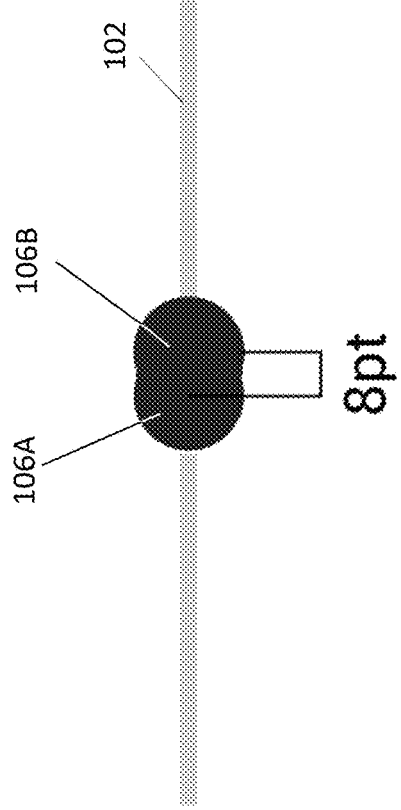
FIG. 8A depicts a non-limiting example of a ranger slider in accordance with an implementation of the present disclosure showing two overlapping slider thumbs.

In one or more implementations, a graphical feature, such as an outline, is provided with one of the slider thumbs 106A and 106B to demarcate one of the slider thumbs using the code that is executing in the processor to implement the graphical interface. FIG. 8A depicts a non-limiting example of a range slider in accordance with an implementation of the present disclosure showing two overlapping two slider thumbs. FIG. 8B depicts an alternative example of a ranger slider in accordance with an improved implementation, showing two overlapping two slider thumbs, with one of the overlapping slider thumbs (106A) graphically demarcated from the other (106B).

It is to be appreciated that the range slider 100 can be configured to support particular contexts and applications. Selections and movements of slider thumbs 106 can be restricted or enabled in accordance with particular rules that are executed by one or more hardware processors. FIGS. 9A-9B depict a non-limiting example of a ranger slider operation sequence in which a determination and selection of the slider thumb 106B is made as a function of a relative distance from a user interaction (e.g., tap or drag) along the slider track to one of the slider thumbs 106.

In another non-limiting example, maximum or minimum values (i.e., endpoints) can be defined such that slider thumbs 106 cannot be positioned beyond those respective endpoints. In addition, or in the alternative, a maximum or minimum range can be defined by respective endpoints such that two slider thumbs 106 cannot be positioned closer together or further apart from each other, depending on a particular implementation. Restricting the positioning of a selected slider thumb can be based on one or more variables, such as value or distance between the slider thumbs 106.

For example, a range slider 100 may be configured to support an application in connection with a price selector, in which the price range defined by the slider track 102 is from $0 to $100, but the user desires a restricted range to be $20, at a minimum. FIGS. 10A-10C depict a non-limiting example of a ranger slider operation sequence in accordance with such an implementation, in which selection and movement of at least one slider thumb is restricted or enabled based on a minimum range defined by values respectively associated with the two slider thumbs 106. For example, a range defined by the slider thumbs 106A and 106B of [$30, $50] would be allowed, but a range defined by the slider thumbs 106A and 106B of [$33, $34] would not be allowed.

FIGS. 11A-11C depict examples of customized range sliders 100, in which elements of the range sliders are configured with customized shapes and features. The present disclosure supports customizing the appearance, as well as the behavior, for any of slider track 102, overlays 108 and 110, tick marks 104, value indicators 105, and slider thumbs 106. Programmatically this can occur, for example, by abstracting away from one or more object methods, including through separate abstract classes. One skilled in the art will recognize that such object-oriented functionality makes painting or rendering elements enables customization of a range slider 100. As shown in FIGS. 11A-11C, a plurality of slider thumbs 106 (including three slider thumbs 106 illustrated in FIG. 11B) can be configured in various shapes, as can slider track 102. Similar processes and techniques shown and described herein with regard to range sliders 100 having two slider thumbs 106 are applicable for range sliders 100 having 3 or more slider thumbs 106.

Figure 12:
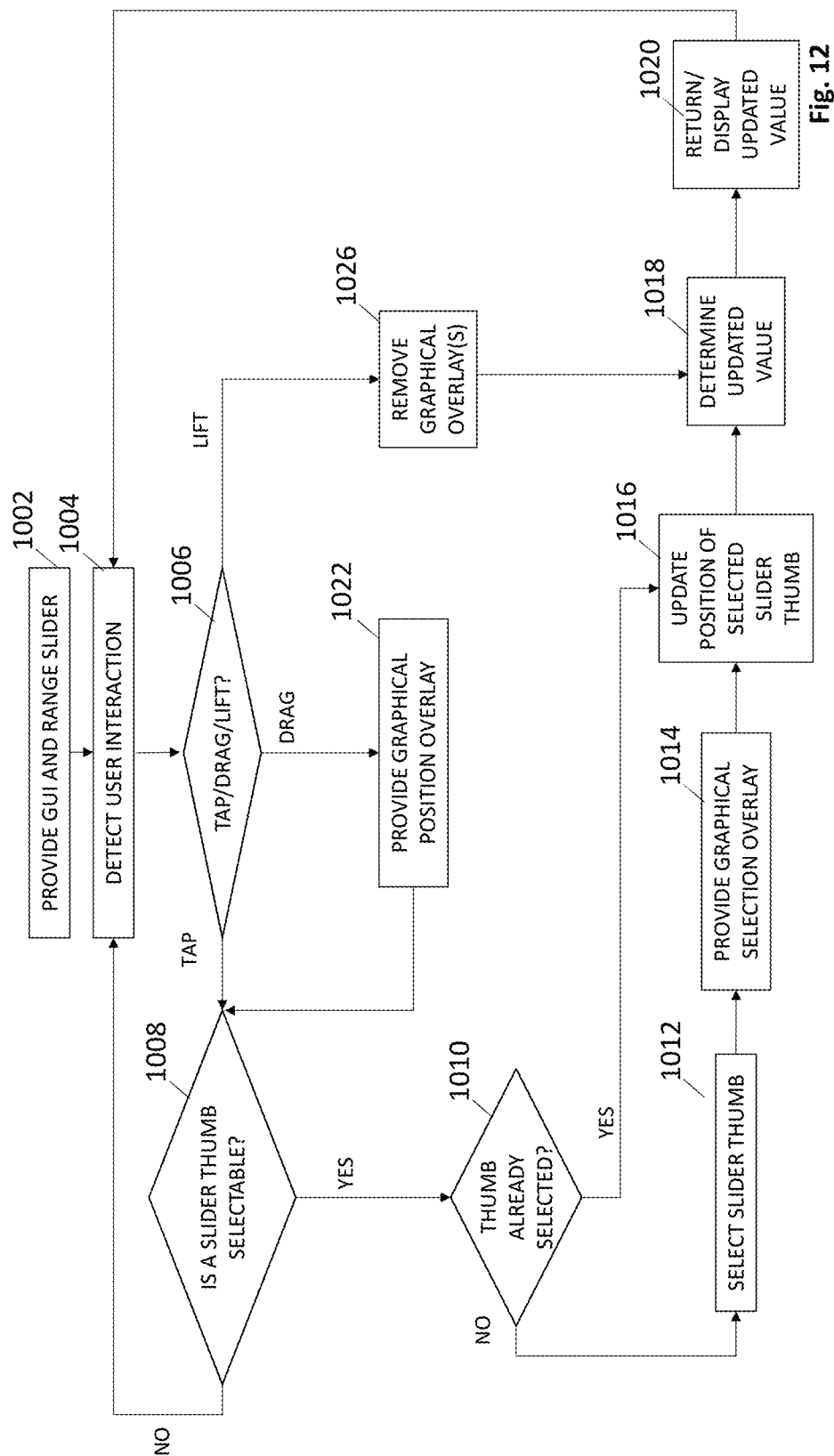
FIG. 12 is an example flow representing features associated with providing a range slider in accordance with an example implementation of the present disclosure.

Turning now to FIG. 12, a flow diagram is described showing a routine 1000 that illustrates a broad aspect of a method providing and handling operations associated with a range slider 100, in accordance with one or more embodiments of the present disclosure. It is to be appreciated that several of the logical operations described herein are implemented as a sequence of computer-implemented acts or program modules running on one or more computing devices as a result of execution of code or implementation of a script in a processor suitably configured by machine readable instructions retrieved from a memory device. Accordingly, the logical operations described herein are referred to variously as operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Continuing with reference to FIG. 12, the process begins at step 1002 in which a graphical user interface and range slider 100 is provided. Thereafter, respective user interaction is detected by one or more hardware processors (step 1004). In step 1006, a determination is made whether the user interaction is a tap, drag or lift. If the determination in step 1006 is that the user interaction is a tap, then the process branches to step 1008 and another determination is made whether any slider thumb 106 in the respective range slider 100 (e.g., slider thumb 106A or slider thumb 106B) is selectable, such as shown and described herein. If the determination in step 1008 is negative, then the process branches back to step 1004. Alternatively, if the determination in step 1008 is affirmative, then the process branches to step 1010 and another determination is made whether a thumb has already been selected. If not, then the process branches to step 1012 and a respective slider thumb 106 is select, such as in accordance with rules shown and described herein. Thereafter, the process continues to step 1014 and a graphical selection overlay 108 is provided around the selected slider thumb 106. The process then continues to step 1016 and a position of the selected thumb slider is updated to reflect the location of the user's interaction. Thereafter, an updated value associated with the new location, such as a function of the location of the selected slider thumb 106 along the slider track 102 (step 1018) and the new value is displayed, such as in indicator 105, and returned for further use, such as in a respective software application executed by a processor (step 1020).

Continuing with reference to FIG. 12, if the determination in step 1010 is affirmative, then the process branches to step 1016, and proceeds as described above.

Continuing with reference to FIG. 12, if the determination in step 1006 is that the user interaction is a drag, then the process branches to step 1022 and a graphical position overlay 110 is displayed. Thereafter, the process continues to step 1008 and proceeds as described above.

Continuing with reference to FIG. 12, if the determination in step 1006 is that the user interaction is a lift, then the process branches to step 1026 and any graphical overlays (e.g., overlays 108 and 110) are removed from the range slider 100. Thereafter, the process continues to step 1018, and proceeds as described above.

Accordingly, various implementations of the present disclosure provide technical improvements in the operation and functioning of computing devices. The range slider of the present disclosure enhances a graphical user interface with controls for improving selection of respective slider thumbs, as well as to ensure improved accuracy, ease of use, and speed. These and other improvements shown and described herein make the range slider of the present disclosure particularly useful for instances in which a user prefers precise control over both ends of a specific range.

The systems and techniques described here can be implemented on a computing device having a display device such as, for example, a CRT (cathode ray tube), LCD (liquid crystal display) or LED (light emitting diode) monitor for displaying information to the user and a keyboard and a pointing device, such as a mouse or a trackball, by which the user can provide input to the computing device. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The terms "a," "an," and "the," as used in this disclosure, means "one or more," unless expressly specified otherwise.

The term "activity," as used in this disclosure with regard to a communicating device, means an input, entry, instruction, selection, action, or any interaction with the communicating device by a client-side user that can cause the communicating device to perform or carry out a process, task, function, or operation. An "activity" can include, for example, launching a client app such as a web browser in the communicating device or interacting with the client app to find, fetch, load, process, or render a computer asset based on a sequence of input data or instructions (for example, an entry comprising a single or a sequence of natural language terms).

The term "backbone," as used in this disclosure, means a transmission medium or infrastructure that interconnects one or more computing devices or communicating devices to provide a path that conveys data packets or instructions between the computing devices or communicating devices. The backbone can include a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, GSM voice calls, SMS, EMS, MMS messaging, CDMA, TDMA, PDC, WCDMA, CDMA2000, GPRS, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer" or "computing device," as used in this disclosure, means any machine, device, circuit, component, or module, or any system of machines, devices, circuits, components, or modules, which can be capable of manipulating data according to one or more instructions, such as, for example, without limitation, a processor, an application specific integrated circuit (ASIC), a field programmable gate array (FPGA), a microprocessor (µP), a central processing unit (CPU), a graphic processing unit (GPU), a general purpose computer, a super computer, a personal computer, a laptop computer, a palmtop computer, a notebook computer, a smart phone, a mobile phone, a tablet, a desktop computer, a workstation computer, a server, a server farm, a computer cloud, or an array of processors, ASICS, FPGAs, µPs, CPUs, GPUs, general purpose computers, super computers, personal computers, laptop computers, palmtop computers, notebook computers, desktop computers, workstation computers, or servers. A computer or computing device can include hardware, firmware, or software that can transmit or receive data packets or instructions over a communication link. The computer or computing device can be portable or stationary.

The term "computer asset," as used in this disclosure, means software, a software application, a web application, a webpage, a document, a file, a record, an API, web content, a computer application, a computer program, computer code, machine executable instructions, or firmware. A computer asset can include an information resource. A computer asset can include machine instructions for a programmable computing device, and can be implemented in a high-level procedural or object-oriented programming language, or in assembly/machine language.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers. The computer-readable medium can include magnetic discs, optical disks, memory, or Programmable Logic Devices (PLDs).

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "information resource," as used in this disclosure means, but is not limited to, computer code or computer executable instructions that cause content to be displayed on a display device, or to invoke a function to display the content such as on a website or webpage that includes primary content or a search results landing page provided by a search engine.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-implemented system, comprising:
a hardware processor;
a display; and
a processor readable hardware storage device, wherein the processor readable hardware storage device has processor executable instructions that, when executed by the processor, cause the system to perform the following:
provide, via the display, a graphical user interface and a range slider within the graphical user interface, wherein the range slider comprises a first slider thumb, a second slider thumb, and a slider track having the first and second slider thumbs slidable graphically therealong, and further wherein each of the first slider thumb and the second slider thumb is positioned at a respective location along the slider track and each is associated with a corresponding value along the slider track;
detect user interaction in the graphical user interface via the range slider;
identify that the user interaction includes at least one of a tap or a drag;
respond to the user interaction by:
receiving a value representing the tap or the drag;
processing the value to determine a location along the slider track of the user interaction;
identifying, as a function of at least the determined location, the user interaction as being with one of the first slider thumb and the second slider thumb;
selecting the identified one slider thumb;
repositioning the selected one slider thumb to the determined location along the slider track;
providing a graphical selection overlay on the selected slider thumb; and
determining a slider track value associated with the repositioned location of the selected one slider thumb along the slider track.

2. The computer-implemented system of claim 1, wherein selecting the identified one of the first slider thumb and the second slider thumb further includes:
selecting the first slider thumb by processing the determined location along the slider track of the user interaction, the location along the slider track of the first slider thumb, and the location along the slider track of the second slider thumb, to determine that the location of the user interaction is closer to the position of the first slider thumb than the position of the second slider thumb, and further that the determined location along the slider track of the user interaction is not between the location along the slider track of the first slider thumb and the location along the slider track of the second slider thumb; or
selecting the first slider thumb by processing the determined location along the slider track of the user interaction, the location along the slider track of the first slider thumb, and the location along the slider track of the second slider thumb, to determine that the location of the user interaction is closer to the position of the second slider thumb than the position of the first slider thumb, and further that the determined location along the slider track of the user interaction is not between the location along the slider track of the first slider thumb and the location along the slider track of the second slider thumb.

3. The computer-implemented system of claim 1, wherein the processor readable hardware storage device further has processor executable instructions that, when executed by the processor, cause the system to perform the following:
   identify that the user interaction includes a lift;
   respond to the user interaction by:
      receiving a value representing lift; and
      removing the graphical selection overlay on the selected slider thumb.

4. The computer-implemented system of claim 3, wherein the processor readable hardware storage device further has processor executable instructions that, when executed by the processor, cause the system to perform the following:
   transmit, to a software application executing by at least one hardware processor, the slider track value associated with the repositioned location of the selected one slider thumb, wherein the transmitted slider track value associated with the repositioned location of the selected one slider thumb is usable for further processing by the software application.

5. The computer-implemented system of claim 1, wherein the processor readable hardware storage device further has processor executable instructions that, when executed by the processor, cause the system to perform the following:
   identify that the user interaction is a drag;
   respond to the user interaction by:
      receiving information representing drag displacement, wherein the drag displacement represents that the user interaction has at least a non-zero movement;
      processing the information representing the drag displacement to determine a direction of movement along the slider track of the user interaction;
      identifying, as a function of at least the determined direction of movement, one of the first slider thumb and the second slider thumb;
      selecting the one slider thumb identified on the basis of the determined direction of movement;
      repositioning the selected one slider thumb to the determined location along the slider track;
      providing a graphical selection overlay on the selected slider thumb; and
      determining a slider track value associated with the repositioned location of the selected one slider thumb along the slider track.

6. The computer-implemented system of claim 1, wherein the processor readable hardware storage device further has processor executable instructions that, when executed by the processor, cause the system to perform the following:
   detect, in the graphical user interface via the range slider, further user interaction;
   identify that the further user interaction includes at least one of a tap or a drag;
   respond to the user interaction by:
      receiving a second value representing the tap or the drag associated with the further user interaction;
      processing the second value to determine a location along the slider track of the further user interaction;
      determining, as a function of the determined location, a first location along the slider track of the first slider thumb, and a second location along the slider track of the second slider thumb, to determine that the location of the user interaction is along the slider track between the first slider thumb and the second slider thumb; and
      providing a graphical position overlay in the range slider substantially at the position location along the slider track of the further user interaction.

7. The computer-implemented system of claim 6, wherein the processor readable hardware storage device further has processor executable instructions that, when executed by the processor, cause the system to perform the following:
   remove the graphical selection overlay, and
   deselect the selected one slider thumb.

8. A computer-implemented method, the method comprising:
   providing, via a display, a graphical user interface and a range slider within the graphical user interface, wherein the range slider comprises a first slider thumb, a second slider thumb, and a slider track having the first and second slider thumbs slidable graphically therealong, and further wherein each of the first slider thumb and the second slider thumb is positioned at a respective location along the slider track and each is associated with a corresponding value along the slider track;
   detecting, by a hardware processor configured by executing instructions stored on processor readable media, user interaction in the graphical user interface via the range slider;
   identifying, by the processor, that the user interaction includes at least one of a tap or a drag;
   responding, by the processor, to the user interaction by:
      receiving a value representing the tap or the drag;
      processing the value to determine a location along the slider track of the user interaction;
      identifying, as a function of at least the determined location, the user interaction as being with one of the first slider thumb and the second slider thumb;
      selecting the identified one slider thumb;
      repositioning the selected one slider thumb to the determined location along the slider track;
      providing a graphical selection overlay on the selected slider thumb; and
      determining a slider track value associated with the repositioned location of the selected one slider thumb along the slider track.

9. The computer-implemented method of claim 8, wherein selecting the identified one of the first slider thumb and the second slider thumb further includes:
   selecting the first slider thumb by processing the determined location along the slider track of the user interaction, the location along the slider track of the first slider thumb, and the location along the slider track of the second slider thumb, to determine that the location of the user interaction is closer to the position of the first slider thumb than the position of the second slider thumb, and further that the determined location along the slider track of the user interaction is not between the location along the slider track of the first slider thumb and the location along the slider track of the second slider thumb; or
   selecting the first slider thumb by processing the determined location along the slider track of the user interaction, the location along the slider track of the first slider thumb, and the location along the slider track of the second slider thumb, to determine that the location of the user interaction is closer to the position of the second slider thumb than the position of the first slider thumb, and further that the determined location along the slider track of the user interaction is not between the location along the slider track of the first slider thumb and the location along the slider track of the second slider thumb.

10. The computer-implemented method of claim 8, further comprising:

identifying, by the processor, that the user interaction includes a lift;
responding, by the processor, to the user interaction by:
receiving a value representing lift; and
removing the graphical selection overlay on the selected slider thumb.

11. The computer-implemented method of claim 10, further comprising:
transmitting, by the processor to a software application executing by at least one hardware processor, the slider track value associated with the repositioned location of the selected one slider thumb, wherein the transmitted slider track value associated with the repositioned location of the selected one slider thumb is usable for further processing by the software application.

12. The computer-implemented method of claim 8, further comprising:
identifying, by the processor, that the user interaction is a drag;
responding, by the processor to the user interaction by:
receiving information representing drag displacement, wherein the drag displacement represents that the user interaction has at least a non-zero movement;
processing the information representing the drag displacement to determine a direction of movement along the slider track of the user interaction;
identifying, as a function of at least the determined direction of movement, one of the first slider thumb and the second slider thumb;
selecting the one slider thumb identified on the basis of the determined direction of movement;
repositioning the selected one slider thumb to the determined location along the slider track;
providing a graphical selection overlay on the selected slider thumb; and
determining a slider track value associated with the repositioned location of the selected one slider thumb along the slider track.

13. The computer-implemented method of claim 8, further comprising:
detecting, by the processor, in the graphical user interface via the range slider, further user interaction;
identifying, by the processor, that the further user interaction includes at least one of a tap or a drag;
responding, by the processor, to the user interaction by:
receiving a second value representing the tap or the drag associated with the further user interaction;
processing the second value to determine a location along the slider track of the further user interaction;
determining, as a function of the determined location, a first location along the slider track of the first slider thumb, and a second location along the slider track of the second slider thumb, to determine that the location of the user interaction is along the slider track between the first slider thumb and the second slider thumb; and
providing a graphical position overlay in the range slider substantially at the position location along the slider track of the further user interaction.

14. The computer-implemented method of claim 13, further comprising:
removing, by the processor, the graphical selection overlay, and
deselecting, by the processor, the selected one slider thumb.

15. A non-transitory computer storage medium encoded with a computer program, the program comprising instructions that when executed by a hardware processor cause the hardware processor to perform operations comprising:
provide, via a display, a graphical user interface and a range slider within the graphical user interface, wherein the range slider comprises a first slider thumb, a second slider thumb, and a slider track having the first and second slider thumbs slidable graphically therealong, and further wherein each of the first slider thumb and the second slider thumb is positioned at a respective location along the slider track and each is associated with a corresponding value along the slider track;
detect user interaction in the graphical user interface via the range slider;
identify that the user interaction includes at least one of a tap or a drag;
respond to the user interaction by:
receiving a value representing the tap or the drag;
processing the value to determine a location along the slider track of the user interaction;
identifying, as a function of at least the determined location, the user interaction as being with one of the first slider thumb and the second slider thumb;
selecting the identified one slider thumb;
repositioning the selected one slider thumb to the determined location along the slider track;
providing a graphical selection overlay on the selected slider thumb; and
determining a slider track value associated with the repositioned location of the selected one slider thumb along the slider track.

16. The non-transitory computer storage medium of claim 15, wherein selecting the identified one of the first slider thumb and the second slider thumb further includes:
selecting the first slider thumb by processing the determined location along the slider track of the user interaction, the location along the slider track of the first slider thumb, and the location along the slider track of the second slider thumb, to determine that the location of the user interaction is closer to the position of the first slider thumb than the position of the second slider thumb, and further that the determined location along the slider track of the user interaction is not between the location along the slider track of the first slider thumb and the location along the slider track of the second slider thumb; or
selecting the first slider thumb by processing the determined location along the slider track of the user interaction, the location along the slider track of the first slider thumb, and the location along the slider track of the second slider thumb, to determine that the location of the user interaction is closer to the position of the second slider thumb than the position of the first slider thumb, and further that the determined location along the slider track of the user interaction is not between the location along the slider track of the first slider thumb and the location along the slider track of the second slider thumb.

17. The non-transitory computer storage medium of claim 15, further comprising instructions that when executed by the hardware processor cause the hardware processor to perform operations comprising:
identify that the user interaction includes a lift;
respond to the user interaction by:
receiving a value representing lift; and
removing the graphical selection overlay on the selected slider thumb.

18. The non-transitory computer storage medium of claim 17, further comprising instructions that when executed by the hardware processor cause the hardware processor to perform operations comprising:
  transmit, to a software application executing by at least one hardware processor, the slider track value associated with the repositioned location of the selected one slider thumb, wherein the transmitted slider track value associated with the repositioned location of the selected one slider thumb is usable for further processing by the software application.

19. The non-transitory computer storage medium of claim 15, further comprising instructions that when executed by the hardware processor cause the hardware processor to perform operations comprising:
  identify that the user interaction is a drag;
  respond to the user interaction by:
    receiving information representing drag displacement, wherein the drag displacement represents that the user interaction has at least a non-zero movement;
    processing the information representing the drag displacement to determine a direction of movement along the slider track of the user interaction;
    identifying, as a function of at least the determined direction of movement, one of the first slider thumb and the second slider thumb;
    selecting the one slider thumb identified on the basis of the determined direction of movement;
    repositioning the selected one slider thumb to the determined location along the slider track;
    providing a graphical selection overlay on the selected slider thumb; and
  determining a slider track value associated with the repositioned location of the selected one slider thumb along the slider track.

20. The non-transitory computer storage medium of claim 15, further comprising instructions that when executed by the hardware processor cause the hardware processor to perform operations comprising:
  detect, in the graphical user interface via the range slider, further user interaction;
  identify that the further user interaction includes at least one of a tap or a drag;
  respond to the user interaction by:
    receiving a second value representing the tap or the drag associated with the further user interaction;
    processing the second value to determine a location along the slider track of the further user interaction;
    determining, as a function of the determined location, a first location along the slider track of the first slider thumb, and a second location along the slider track of the second slider thumb, to determine that the location of the user interaction is along the slider track between the first slider thumb and the second slider thumb; and
    providing a graphical position overlay in the range slider substantially at the position location along the slider track of the further user interaction.

* * * * *